(No Model.)

B. C. SABIN.
COOKING KETTLE.

No. 525,924.  Patented Sept. 11, 1894.

Witnesses.
N. T. Sabin
E. S. Wilcox

Belle C. Sabin
Inventor.

THE NORRIS PETERS CO., PHOTO-LITHO., WASHINGTON, D. C.

UNITED STATES PATENT OFFICE.

BELLE C. SABIN, OF TACOMA, WASHINGTON.

COOKING-KETTLE.

SPECIFICATION forming part of Letters Patent No. 525,924, dated September 11, 1894.

Application filed August 3, 1893. Serial No. 482,276. (No model.)

*To all whom it may concern:*

Be it known that I, BELLE C. SABIN, of Tacoma, in the county of Pierce and State of Washington, have invented certain new and useful Improvements in Cooking-Kettles; and I do hereby declare that the following is a clear, full, and exact description of the invention, which will enable others skilled in the art to which it appertains to make and use the same, reference being had to the accompanying drawings, and the letters of reference marked thereon, which form part of this specification.

This invention relates to certain improvements in cooking kettles.

The invention consists in certain novel features of construction and in combination of parts more fully described hereinafter and particularly pointed out in the claim.

Figure 1:
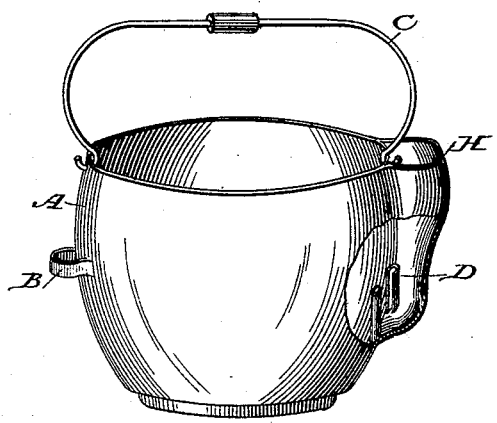
Figure 4:
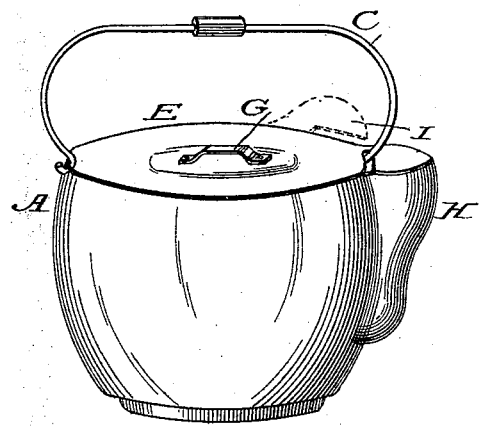
Figure 3:
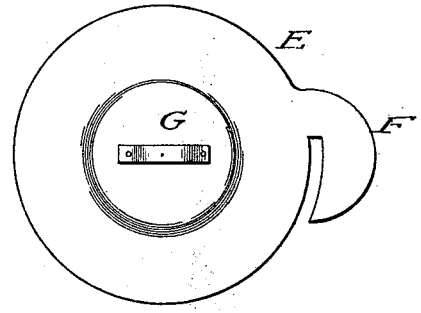
Figure 2:
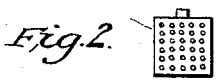

Referring to the accompanying drawings, in which similar letters refer to similar parts, Figure 1, is a perspective of the kettle with the lid off and parts of the kettle and lip broken away. Fig. 2, is a plan view of the strainer. Fig. 3, is a top plan view of the lid or cover. Fig. 4, is a detailed perspective of the kettle, with lip and cover on.

In the drawings, the reference letter "A," indicates the kettle proper.

"B" indicates a handle securely fastened to the back side of the kettle.

"C" indicates the bail.

"D" indicates ways or guides on the inner side of the kettle.

"E," Fig. 3, indicates the cover or lid, the main part being flanged to fit the kettle closely while the projection "F" covers the lip closely.

"G" indicates a handle on the lid.

"H" indicates the lip, which is to be made with a large flared top and is attached to the kettle over the hole covered by the strainer.

The dotted lines "I" indicate the position of the lid when it is turned to uncover the lip.

Fig. 2 indicates the strainer.

Referring to Fig. 1, it will be seen that the guides "D" which are rigidly attached to the inside of the kettle, near the bottom, and around the aperture, will allow the strainers to be readily inserted or removed. The strainers which are to be made in a graduated series, when placed in the guides "D," are to prevent any article, being cooked in the kettle, from passing out when drawing off the water, and also to strain soups, gravies and pudding sauces, which can be made most successfully in this kettle. By means of the lip the water is poured directly from the bottom of the kettle without disturbing its contents and without allowing the steam to escape. When adding water to the kettle through the lip "H," which is enlarged and flared at the top for that purpose, it enters at the bottom of the kettle instead of being poured in at the top. This arrangement together with the tight fitting cover, Fig. 3, preserves an even temperature in the kettle at all times, thereby insuring better cooking, better flavors and less inconvenience than by the ordinary kettle, where in order to add water to, or withdraw it from the kettle, the contents of the kettle are exposed to a cold draft. Again, the hands and person of the operator of this kettle are protected from hot steam as the kettle is fed through the lip, with the top on the kettle, and before removing its contents the kettle can be drained dry by means of the lip.

The strainers, Fig. 2, are to be made in a graduated series to suit all kinds of cooking and straining. They may be made of either punctured sheet metal or of wire gauze, and should be made so as to work easily in the ways "D" and are to be inserted or removed from the inside of the kettle. The operator can determine what sized holes are required in the strainers for different kinds of cooking and select from the series the one adapted to each particular use. When the kettle is ready for use as shown in Fig. 4, the operator can shift the cover from the lip to the position shown by dotted lines "I," by taking hold of the handle "G" and turning the cover in the kettle, the slit allowing the lip cover to work around the bail freely. The kettle is then ready to receive water, or deliver it through the lip.

The entire cover, Fig. 3, is to be removed when the articles to be cooked are put in the kettle or taken from it, which is done by lifting with the handle "G," but soups, gravies, &c., are strained directly from the kettle by way of the lip.

The kettle is handled and manipulated with the bail "C" and the handle "B."

The kettle may be made of any of the ordinary materials for that purpose and may have either a flat or round bottom, as desired.

In boiling meats, vegetables, &c., this kettle gives the same advantages over the ordinary kettle that the inclosed baking pan gives over the open pan, namely: retains all the juices, and an even temperature, thereby giving a superior flavor to the cooking.

Obviously various changes might be made in the forms, construction and arrangement of the parts described without departing from the spirit and scope of my invention.

Having thus fully described my invention, what I claim as new, and desire to secure by Letters Patent of the United States, is—

A kettle having the side discharge or mouth and a bail and the cover having a lateral projection to close said mouth and a slot to receive one end of the bail, as and for the purpose set forth.

In testimony that I claim the foregoing as my own I affix my signature in the presence of two witnesses.

BELLE C. SABIN.

Witnesses:
H. T. SABIN,
E. D. WILCOX.